United States Patent

[11] 3,602,325

[72] Inventors Adolf Ast
  Messtetten;
  Roland Frey, Tailfingen, both of, Germany
[21] Appl. No. 775,652
[22] Filed Nov. 14, 1968
[45] Patented Aug. 31, 1971
[73] Assignee August Sauter KG
  Ebingen, Wurttemburg, Germany
[32] Priority Nov. 24, 1967
[33] Germany
[31] P 15 49 279.2

[54] WEIGHING APPARATUS
  7 Claims, 1 Drawing Fig.
[52] U.S. Cl. .................................................. 177/169,
  177/178, 177/225
[51] Int. Cl. ..................................................... G01g 1/18,
  G01g 23/14, G01g 23/32
[50] Field of Search ........................................ 177/225,
  164, 168–170, 175, 177, 178

[56] References Cited
UNITED STATES PATENTS

| 892,298 | 6/1908 | Palmer | 177/245 X |
|---|---|---|---|
| 2,040,729 | 5/1936 | Cissey | 177/245 X |
| 2,765,160 | 10/1956 | Dietert et al. | 177/245 X |
| 3,074,496 | 1/1963 | Williams | 177/178 |
| 3,189,111 | 6/1965 | Ast | 177/246 X |
| 3,358,784 | 12/1967 | Weickhardt | 177/178 X |

FOREIGN PATENTS

| 1,052,721 | 12/1966 | Great Britain | 177/225 |

Primary Examiner—Robert S. Ward, Jr.
Attorney—Jacobi and Davidson

ABSTRACT: A balance of the type using a parallelogram linkage for supporting its load pan is provided with adjustable spring means for providing a downward thrust on the pan as a function of scale displacement. The balance is provided with a scale reading from 0 percent to 100 percent. In operation a sample within a preset weight range is placed on the pan, the spring means adjusted until the scale reads 0 percent and the sample is then dried and replaced so that the moisture percentage can be read off directly.

PATENTED AUG 31 1971  3,602,325
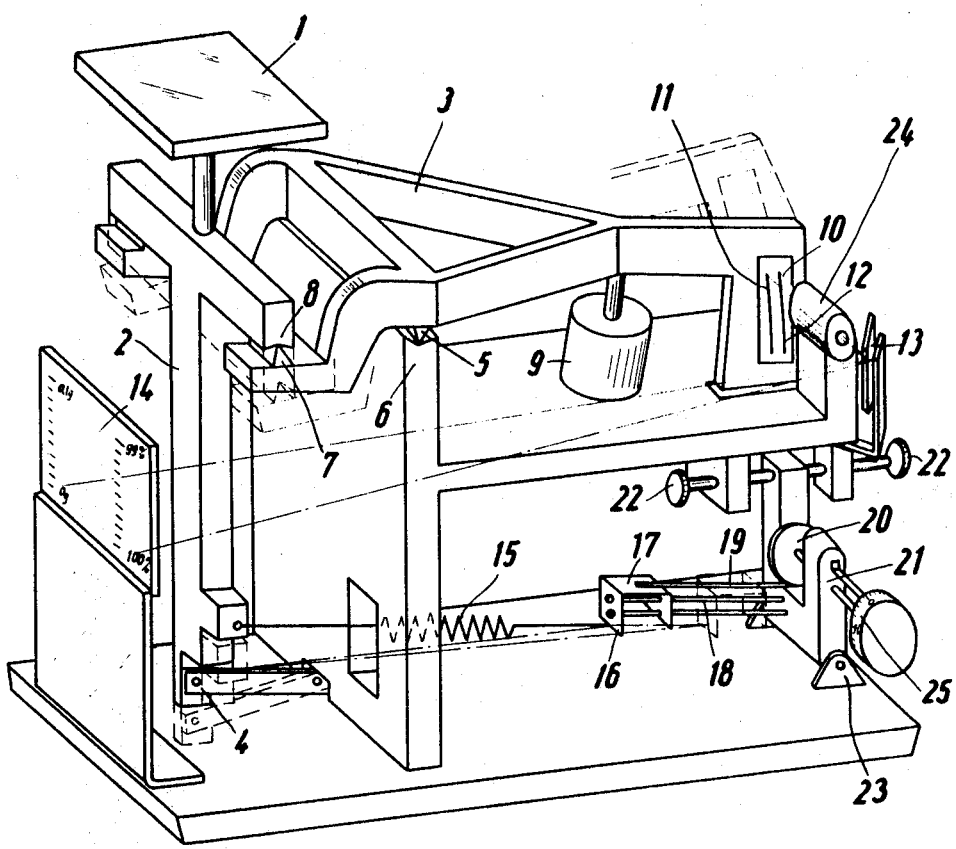
Inventors.
ADOLF AST & ROLAND FREY
By: Jacobs & Davidson,
ATTORNEYS.

WEIGHING APPARATUS

The present invention relates to weighing apparatus or balances and more particularly to those forms of weighing apparatus which comprise an adjustable scale and a load pan carrier which is mounted on links so as to remain parallel to itself when displaced.

Such balances have been equipped with scales for directly reading moisture percentages. To operate them a given weight of sample, usually 10 g. is weighted off using the load pan, then removed and dried, and finally replaced on the pan so that by means of the percentage scale the moisture content can be read off directly. It of course follows that with this type of weighing apparatus the slightest error in the weighing-out of the standard weight of 10 g. will be reflected in an error in the value given for the water content.

In order to dispense with the requirement for accurate weighing-out of the sample, a type of balance has been proposed in which the effective angle of reading the scale by an optical projection system is varied. In this case parallel scales are arranged on a single flat surface. The long graduations dividing up the short graduations of the scale visibly change in direction on changing over from the maximum to the minimum reading angle to shift the image of the scale.

One object of the present invention is to provide a weighing apparatus in which it is not necessary to weigh-out the amount of sample precisely, while allowing the use of normal scales.

The present invention consists in a weighing apparatus comprising a frame, a load support means, a carrier on which the support means is mounted, means for urging the carrier upwards, links pivoted on the carrier so as to form a parallelogram linkage with it for guiding vertical movement of the carrier so that the carrier remains parallel to itself, a scale, means for indicating by means of the scale the degree of downward displacement of the carrier from a no-load position occasioned by the placing of a load on the load support means, a spring means which is connected with the parallelogram linkage for exerting a torque on the linkage dependent on the angular setting of the linkage, the torque being zero in the no-load position of the carrier, means for adjusting the spring means for setting the torque exerted by it when the carrier is out of the no-load position, and means for adjusting the direction of action of the spring.

In accordance with a preferred feature of the invention the apparatus comprises a spring means in the form of a tension spring whose one end is connected with the carrier, the tension spring being arranged to be parallel to the links in a no-load position of the carrier. The apparatus can additionally comprise a carriage on which one end of the spring remote from the carrier is attached, a guide rod for the carriage, and means for pulling the carriage along the rod. Means can be provided for adjusting the position of the rod for insuring that the spring is parallel to the links in the no-load position of the carrier.

In accordance with a still further preferred feature of the invention the apparatus comprises a drum for winding-up the means for pulling the carriage along the rod, and a scale for indicating the position of rotation of the drum.

One embodiment of the invention is now described with reference to the accompanying diagrammatic drawing.

The weighing apparatus shown in the drawing comprises a load support means in the form of a pan 1 with a vertically arranged pan-carrier 2 which rests on a weighing beam 3. The weighing beam 3 is carried on bearings comprising knife edges 5 and abutments 6. The beam 3 is of a generally Y-shaped construction. Its two depending limbs to the left-hand side of the bearings adjacent to the carrier 2 function as links and together with a pivoting link 4 connected with the bottom of the carrier 2, and the carrier itself, form a parallelogram linkage so that the carrier 2 remains parallel to itself when it is moved up and down. The carrier 2 is supported on the beam 3 by means of knife edges 7 and abutments 8.

The right-hand end of the beam 3 carries a weight or gravity bob 9 so that the system comprising the beam 3, the carrier 2, the link 4, and the pan 1 functions as an inclination balance. The beam 3 is also provided with a scale carrier 10 with two series of scale graduations, that is to say a series of graduations 11 for direct reading of the weight of a sample placed on the pan and a series of graduations 12 denoting percentages, the 100 percent graduation of the latter series being opposite the zero graduation of the first series. Sections of the two series of graduations are projected on to a ground glass screen 14 by means of lens system 24 and a mirror 13 whose angular setting can be adjusted.

An approximately horizontal tension spring 15 has one end fixed at 16 to a carriage or slide 17 while the other end is connected with the carrier 2 at a position somewhat above the point of connection between the carrier 2 and the link 4. The spring 15 passes through an opening in an upright frame part, not especially referenced, which itself is carried on a horizontal base. The slide 17 is arranged to move along rod 18 which is so arranged that in the no-load position of the carrier 2 and pan 1, when the 0 g. position is registered on the ground glass screen 14, it is parallel to the link 4 and the links constituted by the left-hand parts of the beam 3. A flexible pulling means or filament 19 is attached to the slide 17 and can be wound up on a drum 20 which is journaled in a holding means 21 carrying the rod 18. The holding means is pivoted at its bottom part in swivel bearings 23 mounted on the base of the frame. An upwardly extending lug on the holding means 21 can be moved by means of two setting screws 22 so as to adjust the direction of action of the spring. By pivoting the holding means 21 it is possible to insure that the spring 15 and guide rod 18 are parallel to the link 4 and the beam links constituted by the left-hand ends of the beam 3. The drum 20 has a scale 25 with one hundred divisions in order for the operator to be able to note the setting of the slide 17 on the rod 18 and the tension of the spring 15, after adjustment.

The adjustment of the position of the slide 17 could also take place by means of a threaded lead screw journaled in the holder 21 and having a scale on its head, suitable means being provided for adjusting the angle of the spring.

In inclination balances specifically designed for determining percentage moisture contents, it is usual for the maximum value of the scale to correspond to some standard sample weight which is always taken, for instance 10 g.

However, the balance in accordance with the invention is designed for a variable sample weight, extending from 9 g. to 11 g. If the sample weight is exactly 11 g., then the percentage scale gives a reading of 1 percent without any additional force being supplied by the spring. That is to say, the drum 20 is turned until no force is applied. However, if a weight below 11 g. (but not below 9 g.) is placed on the pan 1, the drum 20 must be turned until the 0 percent reading is obtained. If, for instance, the actual sample weight is 10 g., then an additional downward force on the carrier 2 must be exerted by the spring equal to 1 g., while, if the sample weight is 9 g., a force of 2 g. is necessary.

To determine a moisture content of a sample, the sample is removed from the pan and dried and then replaced on the pan. The moisture percentage can then be directly read from the percentage graduations.

In the no-load position of the carrier 2 and the pan 1, corresponding to 100 percent on the percentage scale, the torque exerted by the spring 15 on the parallelogram linkage, and therefore the downward component on the carrier 2 due to the spring, will be zero since the line of action of the spring 15 will have been made parallel to the link 4 and the line extending between the knife edges 5 and 7, by suitable adjustment of the screws 22, while as the carrier 2 is moved downwards by the placing of a load on the pan 1, the spring 15 applies a torque to the parallelogram linkage which depends upon the angular displacement of the linkage.

An important advantage of the weighing apparatus in accordance with the invention is that the setting of the graduations is achieved in a purely mechanical manner without the exact weight of the sample having to be determined. The 100 division scale 25 can be used to register the position of the slide 17 adopted for a particular weighing so that during the drying of the sample the slide 17 can be set for other samples and then returned to the appropriate position for the sample after drying.

As already mentioned the drum 20 is turned so as to set the carriage and the part 19 so that after the sample is dried, the zero graduation of the percent scale is registered. When the weighing apparatus is fully loaded, the beam 3, the spring 15, and the link 4 assume the positions shown in broken lines in the drawing.

Various modifications can be made in the weighing apparatus in accordance with the invention. Thus, for example, the apparatus can be designed to operate as a spring balance instead of an inclination balance. The invention can also be applied to balances in which the scale is adjusted and not specifically designed for giving direct readings of moisture contents.

What we claim is:

1. A weighing apparatus for the determination of a percentage loss of weight in a substance subjected to a treatment between two weighing operations, the apparatus comprising a frame, a load support means, a carrier on which the support means is mounted, means for urging the carrier upwards, links pivoted on the carrier so as to form a parallelogram linkage with it for guiding vertical movement of the carrier so that the carrier remains parallel to its initial position, said parallelogram being nonrectangular in its no-load position, said linkage including upper and lower link portions, a scale, and means for indicating by means of the scale the degree of downward displacement of the carrier from a no-load position occasioned by the placing of a load on the load support means, a tension spring having one end connected with the parallelogram linkage for exerting a torque on the linkage dependent on the angular setting of the linkage, the torque being zero in the no-load position of the carrier, means for adjusting said spring for setting the torque exerted by said spring when the carrier is out of the no-load position, and means for adjusting the direction of action of said spring, said direction of action of said spring being substantially parallel to said upper and lower link portions in the no-load position of said carrier.

2. An apparatus according to claim 1 comprising a spring means in the form of a tension spring whose one end is connected with the carrier.

3. A weighing apparatus according to claim 2 comprising a carriage on which one end of the spring remote from the carrier is attached, a guide rod extending substantially in the direction of action of the spring means provided for the carriage, and means for pulling the carriage along the rod substantially in the direction of action of the spring means.

4. A weighing apparatus comprising a frame, a load support means, a carrier on which the support means is mounted, means for urging the carrier upwards, links pivoted on the carrier so as to form a parallelogram linkage with it for guiding vertical movement of the carrier so that the carrier remains parallel to itself, a scale, and means for indicating by means of the scale the degree of downward displacement of the carrier from a no-load position occasioned by the placing of a load on the load support means, a tension spring having one end connected to said carrier for exerting a torque on the linkage dependent on the angular setting of the linkage, the torque being zero in the no-load position of the carrier, means for adjusting the spring means for setting the torque exerted by it when the carrier is out of the no-load position, said means for adjusting the spring means including a carriage on which one end of the spring remote from the carrier is attached, a guide rod extending substantially in the direction of action of the spring means provided for the carriage, and means for pulling the carriage along the rod substantially in the direction of action of the spring means, and means for adjusting the direction of action of the spring means, said direction of action of said spring means being substantially parallel to said links in the no-load position of said carrier, said means for adjusting the direction of action comprising means for adjusting the position of the rod for insuring that the spring is parallel to the links in the no-load position of the carrier.

5. A weighing apparatus according to claim 4 comprising a holding means carrying the rod, pivot means supplying the holding means, a lug extending from the holding means, and screw means for acting on the lug in order to pivot the holding means.

6. A weighing apparatus comprising a frame, a load support means, a carrier on which the support means is mounted, means for urging the carrier upwards, links pivoted on the carrier so as to form a parallelogram linkage with it for guiding vertical movement of the carrier so that the carrier remains parallel to itself, a scale, and means for indicating by means of the scale the degree of downward displacement of the carrier from a no-load position occasioned by the placing of a load on the load support means, a spring means which is connected with the parallelogram linkage for exerting a torque on the linkage dependent on the angular setting of the linkage, the torque being zero in the no-load position of the carrier, means for adjusting the spring means for setting the torque exerted by it when the carrier is out of the no-load position, means for adjusting the direction of action of the spring means, said spring means being in the form of a tension spring whose end is connected with the carrier, the tension spring being arranged parallel to the links in the no-load position of the carrier, a carriage on which one end of the spring remote from the carrier is attached, a guide rod the carriage, means for pulling the carriage along the rod, a drum for winding-up said means for pulling the carriage along the rod, and a scale for indicating the position of rotation of the drum.

7. A weighing apparatus comprising a frame, a load support means, a carrier on which the support means is mounted, means for urging the carrier upwards, links pivoted on the carrier so as to form a parallelogram linkage with it for guiding vertical movement of the carrier so that the carrier remains parallel to itself, a scale, and means for indicating by means of the scale the degree of downward displacement of the carrier from a no-load position occasioned by the placing of a load on the load support means, a spring mans which is connected with the parallelogram linkage for exerting a torque on the linkage dependent on the angular setting of the linkage, the torque being zero in the no-load position of the carrier, means for adjusting the spring means for setting the torque exerted by it when the carrier is out of the no-load position, means for adjusting the direction of action of the spring means, said spring means being in the form of a tension spring whose one end is connected with the carrier, the tension spring being arranged parallel to the links in the no-load position of the carrier, a carriage on which one end of the spring remote from the carrier is attached, a guide rod for the carriage, said guide rod having a longitudinal axis disposed in parallel relationship with said links in the no-load position of the carrier, means for pulling the carriage along the rod, a drum for winding-up said means for pulling the carriage along the rod, and a scale for indicating the position of rotation of the drum.